United States Patent [19]
Terwilliger

[11] 3,878,363
[45] Apr. 15, 1975

[54] TIME AND DISTANCE RALLY COMPUTER
[76] Inventor: Raymond G. Terwilliger, 9360 Sandrock Rd., Eden, N.Y. 14057
[22] Filed: July 10, 1974
[21] Appl. No.: 486,964

[52] U.S. Cl. .............................. 235/61 V; 116/133
[51] Int. Cl. ............................................ G06c 27/00
[58] Field of Search .................. 58/152 E; 116/133; 235/61 E, 61 FA, 61 GM, 61 L, 61 NU, 61 S, 61 V, 95 A, 103.5, 104, 119

[56] References Cited
UNITED STATES PATENTS

| | | | |
|---|---|---|---|
| 703,270 | 6/1902 | Hutchins | 235/119 X |
| 2,051,502 | 8/1936 | Swigert | 235/95 A X |
| 2,112,274 | 3/1938 | Dorsett | 235/104 |
| 2,630,021 | 3/1953 | Levin | 235/61 L |
| 3,231,187 | 1/1966 | Rye | 235/61 V |
| 3,762,158 | 10/1973 | Forrester | 58/152 E |

Primary Examiner—Lawrence R. Franklin
Attorney, Agent, or Firm—Stephen E. Revis

[57] ABSTRACT

A time and distance computer particularly suited for use in a motorcycle rally has, in one embodiment a time increment indicator which includes concentrically disposed rings of gear teeth and a distance indicator manually rotatable through shafting; the shafting includes at least one gear which can be moved by a shifting mechanism into engagement with any of the concentric rings of gear teeth so that by manually changing the reading on the distance indicator the time increment indicator is rotated to denote a change in time. The gear ratios are chosen so that an incremental distance input is reflected by an incremental time reading which corresponds to the time it would take to travel the incremental distance at a particular rate of speed. Each of the concentric rings of gear teeth represent a different rate of speed.

6 Claims, 5 Drawing Figures

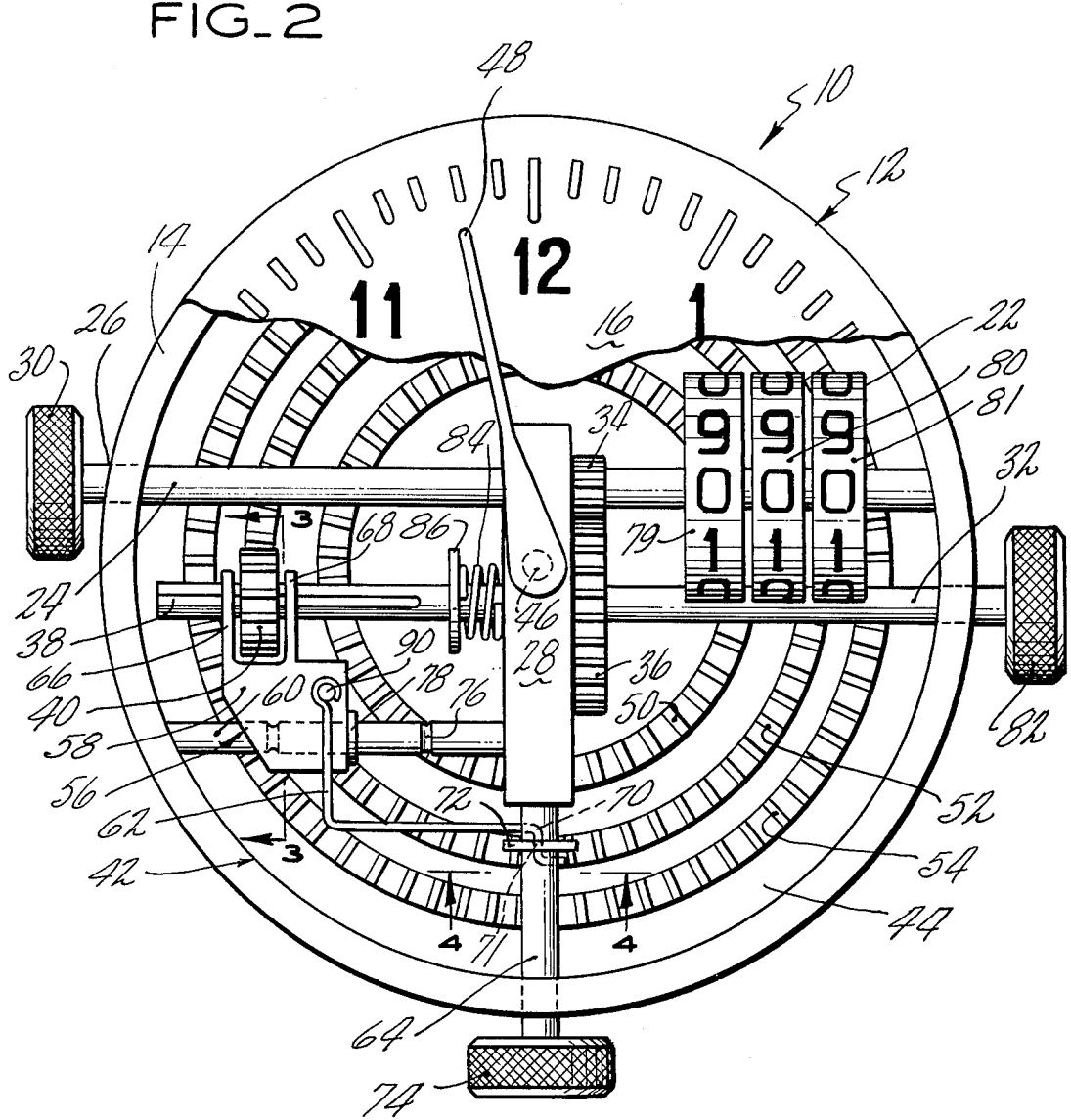
FIG_2

TIME AND DISTANCE RALLY COMPUTER

BACKGROUND OF THE INVENTION

1. Field of the Invention

This invention relates to motor vehicle rally computers.

2. Description of the Prior Art

A common sport among motorcycle enthusiasts is the Enduro which is similar to a sports car rally. The basic concept of an Enduro is to complete a specified course in a time which corresponds, as closely as possible, to a preselected rate of speed. At the present time Enduros are run at either 15, 20 or 24 miles per hour. There are two basic types of Enduros: the overall average Enduro and the checkpoint to checkpoint average Enduro. In the former the required average speed over the entire course from beginning to end is known; in the latter the required average speed from checkpoint to checkpoint is known and is constant. In both types of Enduros checkpoints cannot be spaced apart less than either 3 or 5 miles depending upon the length of the overall race; however, all checkpoints are always positioned on the even tenth of a mile, and the proper time for traveling between checkpoints, no matter what the preselected average speed, must be on an even minute.

There are numerous sports car rally computers on the market but most of these are relatively complex, expensive and bulky and are not suited for carrying on a motorcycle. One such sports car rally computer is described in U.S. Pat. No. 3,231,187 to Rye. There are motorcycle rally computers on the market but generally they are useful at only one particular rate of speed; also, they sometimes lack the ability for resetting during an event and often must be connected mechanically to the motorcycle.

SUMMARY OF THE INVENTION

Accordingly, one object of the present invention is a computer particularly suited for motorcycle rallies and which may easily be used for different required rates of speed.

Another object of the present invention is a rally computer small in size and easily attached to any motorcycle.

A further object of the present invention is a rally computer requiring no mechanical hookups to the vehicle on which it is used.

The computer of one embodiment of the present invention includes a time increment indicator geared through shafting to a distance indicator, the gear ratios between the two indicators being selectively changeable by means of a shifting device, and the reading of the time increment indicator changing in response to an incremental change in the reading of the distance indicator by an amount equal to the time it would take to travel the incremental distance at a preselected rate of speed which corresponds to the selected gear ratio.

In a more particular embodiment of the invention the time increment indicator rotates within a housing and includes a plurality of concentric gear teeth rings having differing numbers of teeth; shafting is connected to a distance indicator and includes one gear selectively engageable by suitable shift means with the gear teeth rings to change the gear ratios between the time and distance indicators; each of the possible gear ratios corresponds to a particular rate of speed such that an incremental change in the distance reading results in a corresponding incremental change in the time reading which would be equivalent to the time it would take to travel said incremental change in distance at the selected rate of speed.

The distance indicator is manually operable. Having selected the desired rate of speed by shifting to the proper gear ratio the rallyist advances the distance indicator by a known number of miles within which distance there cannot be a checkpoint because of the rules of the race. The time increment indicator will move accordingly, and the amount it moves will indicate the amount of time it would take to travel the input distance at the selected rate of speed. This information can be used in various ways by the rallyist, such as to indicate when he is running late and when he is running early as he approaches checkpoints or the end of the race. The rallyist could, for example, keep incrementing the distance indicator every so often to match the distance on the motorcycles odometer; the time indicator, when compared to a wristwatch, will tell him if he is running early or late.

One advantage of the present invention is that a single device may be used at different Enduros which are run at different rates of speed.

Another advantage of the present invention is that it is well suited for use in Enduros wherein it is required to maintain different rates of speeds between different checkpoints.

The foregoing and other objects, features and advantages of the present invention will become more apparent in the light of the following detailed description of preferred embodiments thereof as illustrated in the accompanying drawings.

BRIEF DESCRIPTION OF THE DRAWINGS

FIG. 2 is a view in the same direction as the view of FIG. 1 but with the cover place partly broken away to expose the internal workings of the device.

DESCRIPTION OF THE PREFERRED EMBODIMENTS

Figure 1:
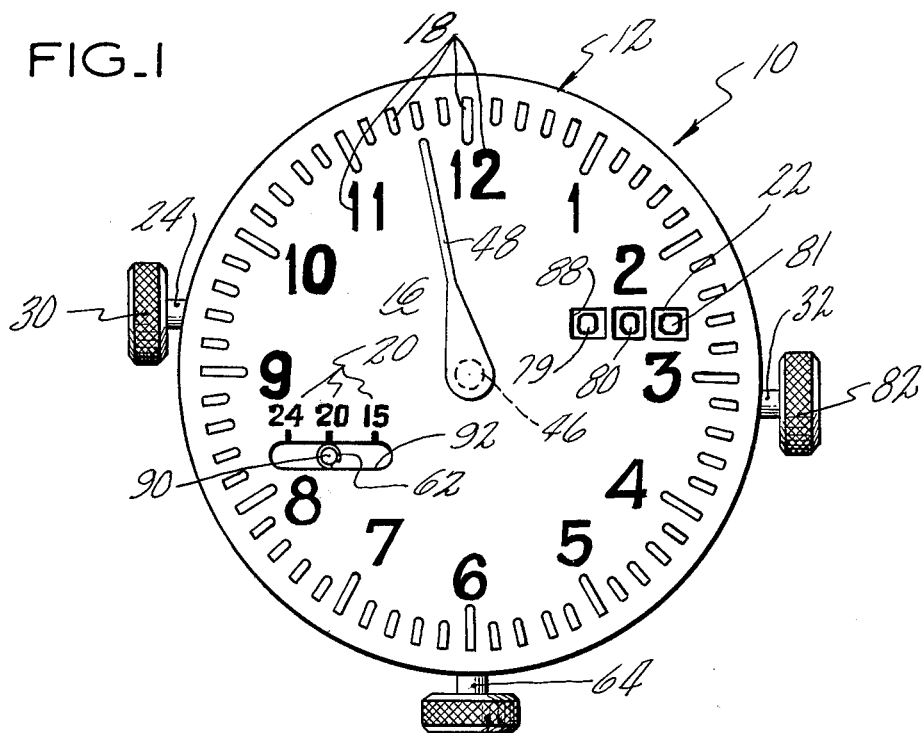
FIG. 1 is an external view of the computer of the present invention as would be seen by a user during a race.

Consider, as an exemplary embodiment of the subject invention, the time and distance computer shown in FIGS. 1 through 5. Referring particularly to FIG. 1, the computer 10 includes a frame 12 comprising a generally cylindrical outer housing 14 and a cover plate 16. The cover plate 16 is fixedly secured to the housing 14 by any suitable means (not shown). The cover plate 16 includes indicia 18 representing a typical clock face. The cover plate 16 also includes indicia 20 representing rates of speed which in this instance happens to be miles per hour.

Referring now to FIG. 2, the cover plate 16 is broken away to expose the internal workings of the computer 10. The computer 10 comprises a mechanical counter or mileage readout indicator hereinafter referred to as the distance indicator 22, the internal workings of which are not shown since it is of standard type. The distance indicator 22 is operable by rotation of a shaft 24 which is journaled through the housing 14 at 26 and in a bearing box 28. The shaft 24 includes a knob 30 external of the frame 12 for manually setting the distance indicator 22. A second shaft 32 is also journaled in the housing 14 and in the bearing box 28. The first shaft 24 is geared to the second shaft 32 by means of gears 34 and 36 mounted respectively on the first shaft 24 and the second shaft 32. The left hand end of the second shaft 32 as viewed in FIG. 2 includes a groove 38. The grooved end of the second shaft 32 carries a gear 40 (hereinafter referred to as input gear 40) which is keyed into the groove 38 so that it rotates simultaneously with the shaft 32 but it is axially slidable along the shaft 32.

Figure 5:
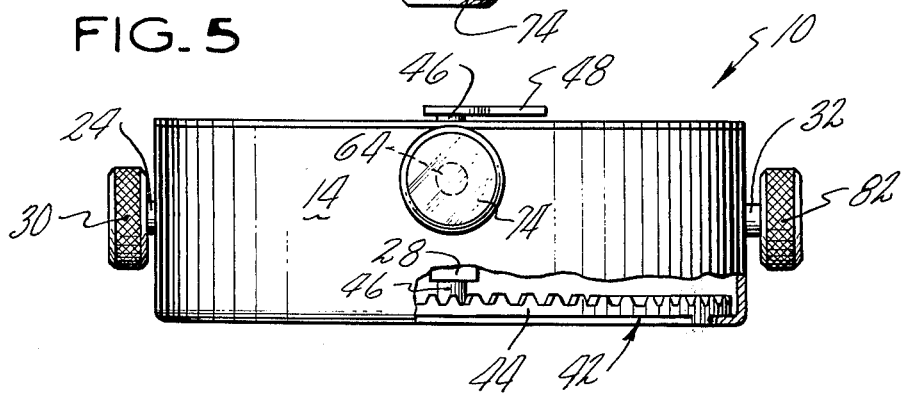
FIG. 5 is a side elevation view, partly broken away, of the invention.

Still referring to FIG. 2, the computer 10 includes a time increment indicator 42 rotatable within the housing 14 and which can also be seen in FIG. 5. The time increment indicator 42 includes a circular gear plate 44 and a shaft 46 fixedly secured to the center thereof. The shaft 46 is also journaled in the bearing box 28. The time increment indicator 42 further includes a minute hand 48 which is external of the frame 12 and is fixedly secured to the shaft 46 so that it rotates at the same speed as the gear plate 44. The gear plate 44 includes three concentric rings 50, 52 and 54 of gear teeth hereinafter referred to as gear teeth rings. Each ring has a different number of teeth.

Figure 3:
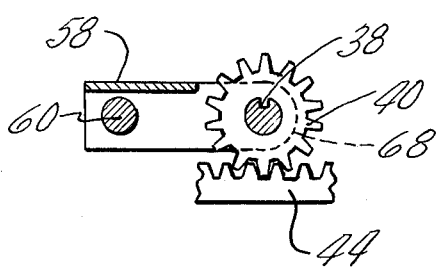
FIG. 3 is a cross-sectional view taken along the line 3—3 of FIG. 2.
Figure 4:
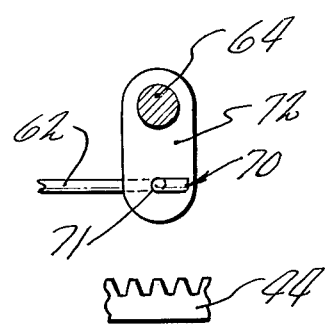
FIG. 4 is a cross-sectional view taken along the line 4—4 of FIG. 2.

The computer 10 includes shaft means 56 for sliding the input gear 40 along the shaft 32 and for selectively positioning the input gear 40 into engagement with any one of the three gear teeth rings 50, 52 and 54. The shift means 56 comprises a yoke 58, a support shaft 60, a shift connector rod 62 and a shift input shaft 64. Referring now to FIGS. 2, 3 and 4 the yoke 58 is slidably mounted on the shaft 60 which is fixedly secured to the housing 14 and the bearing box 28. The yoke 58 includes arms 66, 68 positioned on each side of the input gear 40 but not restricting rotation of the second shaft 32 or the input gear 40. The input shaft 64 is journaled in the housing 14 and in the bearing box 28 and includes a knob 74 external of the frame 12 for manually rotating the input shaft 64. The input shaft 64 includes a plate 72 extending down toward circular gear plate 44. The rod 62 is secured to the yoke 58 and includes a bent end 70 extending under the shaft 64 into an opening 71 in the plate 72. It is apparent that rotation of the shaft 64 will result in the plate 72 either pushing or pulling the yoke 58 along the support shaft 60 which in turn slides the input gear 40 along the second shaft 32. In this manner, by turning the knob 74 the user of the computer 10 can engage the input gear 40 with which ever gear teeth ring 50, 52 and 54 he desires. The support shaft 60 includes several annular grooves 76, and the yoke 58 includes a detent spring 78. As the yoke 58 is slid along the shaft 60 the detent spring will engage one of the grooves 76 and hold the yoke in position. In this embodiment the shaft 60 would include three grooves 76 for holding the yoke 58 in position when the input gear 40 is properly engaged with any one of the three gear teeth rings 50, 52 and 54.

Also, in this embodiment the distance indicator 22 includes three rotatable rings 79, 80 and 81, the right hand most ring 81 indicating tenths of miles. One revolution of the shaft 24 results in one revolution of the ring 81 thereby registering one mile on ring 80 of the distance indicator 22. The gear 34 has 12 teeth, the gear 36 has 48 teeth, the input gear 40 has 12 teeth and the rings 50, 52 and 54 have 45, 60 and 72 teeth, respectively. Thus, the rings 50, 52 and 54 correspond to rates of speed equivalent to 15, 20 and 24 miles per hour, the rates of speed presently used in all Enduro motorcycle rallies. For example, if the input gear 40 is in engagement with the center gear teeth ring 52, and if the shaft 24 is rotated by means of knob 30 so that the distance indicator is changed by an increment of 20 miles then the minute hand 48 will make one complete revolution indicating that the 20 miles should be traveled in 60 minutes if one is to travel at an average rate of speed of 20 miles per hour.

It is sometimes desirable during an Enduro to reset the minute hand 48 or to move it some certain amount without effecting a change in the reading of the distance indicator 22 or vice versa. In this embodiment the second shaft 32 is movable axially such that the gears 34 and 36 may be disengaged. Disengaging the gears 34 and 36 permit one to move the minute hand 48 (which rotates the gear plate 44) without changing the reading of the distance indicator 22. Disengagement of gears 34 and 36 is accomplished by pulling on a knob 82 which is attached to the shaft 32 and is external to the housing 12. A spring 84 is positioned between a plate 86 fixed to the shaft 32 and the bearing box 28 such that the shaft 32 is biased to the left in FIG. 2 so that when the knob 82 is released the gears 34 and 36 will move back into engagement.

Referring once again to FIG. 1 the cover plate 16 includes an opening 88 therein to permit viewing of the distance indicator 22. Also, the yoke 58 includes an indicator pin 90 which extends through another opening 92 through the face plate 16 and which lines up with the indicia 20 to indicate the position of the input gear 40.

Many features of the present invention are shown by way of example only and are not intended to limit the scope of the present invention. For example, the gear plate 44 may have only a single gear teeth ring and the second shaft 32 may carry several input gears such as the input gear 40 but which have different numbers of teeth; the shift mechanism, such as the mechanism 56 could then be used to bring the different input gears into engagement with the single gear teeth ring to effectuate changes in the rate of speed. Further, the present invention is not intended to be limited to the particular shift mechanism 56 shown in the preferred embodiment. For example, the device may be designed so that the pin 90 could be grasped and moved back and forth in the slot 92 to change the position of the input gear 40; this would eliminate the rod 62, plate 72 and shaft 64.

It is further contemplated as being within the scope of the present invention that the indicia indicating time may be inscribed directly on the time increment indicator 42 (rather than on the frame 12) and rotate therewith; in that event the frame may carry a fixed pointer and the indicia would move under the pointer. It is also contemplated as being within the scope of the present invention that a single shaft rather than the two shafts 24 and 32 may be used if desired. The single shaft would carry the distance indicator and a gear corresponding to the input gear 40. In that instance the gear ratios would have to be modified.

Although the invention has been shown and described with respect to a preferred embodiment thereof, it should be understood by those skilled in the art that various other changes and omissions in the form and detail thereof may be made therein without departing from the spirit and the scope of the invention.

Having thus described typical embodiments of my invention which I claim as new and desire to secure by Letters Patent of the United States is:

1. A time and distance computer comprising:

a frame;

rotatable shaft means connected to said frame;

a distance indicator connected to said shaft means and operable by rotation of said shaft means;

a time increment indicator connected to said frame and rotatably mounted relative thereto including at least one gear teeth ring fixedly and concentrically disposed about the axis of rotation of said time increment indicator, said shaft means including at least one input gear movable parallel to the plane of said ring and engageable with said ring, the total number of said rings plus said input gears being greater than two, each engageable combination of said input gears and said rings having a different gear ratio representative of a different rate of speed; and shift means connected to said shaft means for selectively engaging said engageable combinations of said input gears with said rings, said shaft means being manually rotatable for making incremental changes in the reading of said distance indicator, the reading of said time increment indicator changing in response to an incremental change in the reading of said distance indicator by an amount equal to the amount of time it would take to travel said incremental distance at the selected rate of speed, said distance indicator being manually disengageable from said time increment indicator, and when disengaged each indicator may be adjusted without effecting a change in the reading of the other.

2. The time and distance computer according to claim 1 wherein said time indicator includes a plurality of said concentrically disposed gear teeth rings and said shaft means includes only one input gear.

3. The time and distance computer according to claim 1 wherein said shaft means includes a first shaft and a second shaft and said distance indicator is connected to said first shaft and is operable by rotation of said first shaft, and said input gears are disposed on said second shaft, said first and second shaft being geared together so as to rotate simultaneously.

4. The time and distance computer according to claim 3 wherein said time indicator includes a plurality of said concentrically disposed gear teeth rings and said shaft means includes only one input gear, and the axis of said second shaft is perpendicular to the axis of said time increment indicator and said second shaft extends over each of said rings, and said input gear is slidably mounted on said second shaft and said shift means is connected to said input gear for sliding said gear along said second shaft into engagement with said rings.

5. The time and distance computer according to claim 4 wherein said first shaft includes a knob connected thereto for manually rotating said shaft and effecting a change in the reading of said distance indicator.

6. The time and distance computer according to claim 5 wherein said frame includes rate of speed indicia means and said shift means includes indicator means associated with said indicia means for indicating the rate of speed at which said shift means is set.

* * * * *